United States Patent
Atungsiri et al.

(10) Patent No.: US 7,440,506 B2
(45) Date of Patent: Oct. 21, 2008

(54) RECEIVER FOR RECOVERING DATA FROM AN OFDM SYMBOL

(75) Inventors: Samuel Asanbeng Atungsiri, Basingstoke (GB); Taku Yamagata, Kawasaki (JP)

(73) Assignee: Sony United Kingdom Limited, Weybridge (GB)

( * ) Notice: Subject to any disclaimer, the term of this patent is extended or adjusted under 35 U.S.C. 154(b) by 551 days.

(21) Appl. No.: 11/088,310

(22) Filed: Mar. 24, 2005

(65) Prior Publication Data
US 2005/0213680 A1  Sep. 29, 2005

(30) Foreign Application Priority Data
Mar. 26, 2004  (GB)  ............... 0406875.5

(51) Int. Cl.
*H04L 27/28*  (2006.01)
(52) U.S. Cl. .............. 375/260; 375/346; 375/350
(58) Field of Classification Search ......... 375/260, 375/285
See application file for complete search history.

(56) References Cited

U.S. PATENT DOCUMENTS

| | | | |
|---|---|---|---|
| 6,614,852 B1 | 9/2003 | Laurent | |
| 2002/0039383 A1* | 4/2002 | Zhu et al. | ............ 375/214 |
| 2003/0012308 A1 | 1/2003 | Sampath et al. | |
| 2003/0063678 A1 | 4/2003 | Crawford | |
| 2005/0105647 A1 | 5/2005 | Wilhelmsson et al. | |
| 2005/0163258 A1* | 7/2005 | Gore et al. | ............ 375/340 |
| 2005/0213679 A1* | 9/2005 | Yamagata | ............ 375/260 |

FOREIGN PATENT DOCUMENTS

| | | |
|---|---|---|
| EP | 0 998 068 | 5/2000 |
| EP | 0 838 928 | 1/2001 |
| EP | 1 624 602 A1 | 2/2006 |

(Continued)

OTHER PUBLICATIONS

Frieder Sanzi, et al., "An Adaptive Two-Dimensional Channel Estimator for Wireless OFDM with Application to Mobile DVB-T", IEEE Transactions on Broadcasting, XP-011006127, vol. 46, No. 2, Jun. 2000, pp. 128-133.

(Continued)

*Primary Examiner*—Shuwang Liu
*Assistant Examiner*—David Huang
(74) *Attorney, Agent, or Firm*—Oblon, Spivak, McClelland, Maier & Neustadt, P.C.

(57) ABSTRACT

A receiver for recovering data from a received symbol of signal samples generated in accordance with Orthogonal Frequency Division Multiplexing (OFDM), the OFDM symbol including pilot carrier signals, the receiver including a pilot assisted channel estimator comprising a pilot extractor configured to extract the pilot carrier signals from the signal samples, and to generate an estimate of a sample of a channel frequency response for each of the pilot carrier signals in the received OFDM symbol, by comparing the extracted pilot carrier signals with predetermined versions of the pilot carrier signals, and a frequency interpolation filter configured to interpolate the samples of the channel frequency response estimate, and a filter controller, the frequency response of the frequency interpolation filter including a pass bandwidth which is adjustable, and the filter controller configured to adjust the bandwidth of the frequency interpolation filter to reduce noise in the estimate of channel frequency response.

15 Claims, 8 Drawing Sheets

FOREIGN PATENT DOCUMENTS

WO    WO 2004/100413 A1    11/2004

OTHER PUBLICATIONS

Karthik Ramasubramanian, et al., "An OFDM Timing Recovery Scheme with Inherent Delay-Spread Estimation", IEEE Global Telecommunications Conference, XP-010747382, vol. 5 of 6, Nov. 25, 2001, pp. 3111-3115.

Vittoria Mignone, et al., "CD3-OFDM: A Novel Demodulation Scheme for Fixed and Mobile Receivers", IEEE Transactions on Communications, XP-011008784, vol. 44, No. 9, Sep. 1996, pp. 1144-1151.

* cited by examiner

RECEIVER FOR RECOVERING DATA FROM AN OFDM SYMBOL

FIELD OF INVENTION

The present invention relates to receivers operable to recover data from a received symbol of signal samples, the symbol having been generated in accordance with Orthogonal Frequency Division Multiplexing (OFDM). The present invention also relates to methods of detecting and recovering data from received signal samples generated in accordance with OFDM.

BACKGROUND OF INVENTION

In multi-carrier modulation systems such as the OFDM system used for DVB-T [8], pilot symbols are often embedded at known positions within the transmitted signal matrix. These pilot symbols can be used in pilot-assisted channel estimation [4] during demodulation of the OFDM signal. As the pilots only occur at fixed known intervals in both the frequency and time dimensions, pilot interpolation is used to estimate the amplitude and phase response of the channel at points where a pilot carrier is not provided within a currently received OFDM symbol. This interpolation can introduce noise into the channel estimate thereby degrading the performance of the demodulator.

SUMMARY OF INVENTION

It is an object of the present invention to improve the performance of the demodulator, by reducing noise in the channel estimate.

According to an aspect of the invention, there is provided a receiver for recovering data from a symbol of signal samples generated in accordance with Orthogonal Frequency Division Multiplexing (OFDM). The OFDM symbol includes pilot carrier signals. The receiver includes a pilot assisted channel estimator comprising a pilot extractor operable to extract the pilot carrier signals from the signal samples and to generate from the extracted pilots samples of the channel frequency response or channel transfer function estimate. The channel frequency response generator is operable to compare the extracted pilot carrier signals with a predetermined version of the pilot carrier signals. The pilot assisted channel estimator includes a frequency dimension interpolation filter operable to interpolate the pilot-derived samples of the channel frequency response in the frequency dimension, and a filter controller. The frequency response of the frequency interpolation filter has a pass bandwidth, which is adjustable, and the filter controller is operable to adjust the bandwidth of the frequency interpolation filter to the effect of reducing noise in the channel frequency response estimate.

The use of an adjustable pass bandwidth for a frequency dimension interpolation filter can reduce noise in the channel frequency response estimate by enabling an appropriate selection of the bandwidth of the frequency dimension interpolation filter according to currently experienced characteristics of the propagation channel.

The invention recognises that an appropriate selection of the frequency dimension interpolation filter bandwidth can be made on the basis of the delay spread of the channel impulse response. Accordingly, an embodiment of the invention provides that the filter controller is operable to adapt the bandwidth of the interpolation filter in accordance with a delay spread of the channel impulse response, the bandwidth being adjusted in proportion to the length of the delay spread of the channel impulse response estimate which can be computed and provided in the manner described in [5] and [7].

The adjustable bandwidth of the frequency interpolation filter may be provided by generating a frequency dimension interpolation filter according to an algorithm. In some embodiments the frequency interpolation filter comprises a plurality of interpolation filters each having a predetermined bandwidth, the filter controller being operable to select one of the plurality of interpolation filters to adjust the bandwidth of the frequency interpolation filter. Frequency dimension interpolation may be combined with time dimension processing to provide a more accurate estimate of the channel frequency response. Such time dimension processing might include time dimension pilot interpolation. However, frequency dimension interpolation may give rise to aliases of the channel frequency response. These aliases could potentially become a source of noise if not corrected. Accordingly, an embodiment of the invention provides a phase offset calculator to operate in conjunction with the frequency dimension interpolation filter. The phase offset calculator is operable to calculate a phase adjustment to the frequency domain samples of the channel frequency response estimate for input into a phase adjuster. The phase adjuster is operable to apply the phase offset to the channel frequency response estimate. The phase offset when applied has the effect of reducing energy from aliases of the channel frequency response estimate within the pass band window of the frequency dimension interpolation filter.

Various further aspects and features of the present invention are defined in the appended claims.

BRIEF DESCRIPTION OF THE DRAWINGS

One embodiment of the present invention will now be described by way of example only with reference to the accompanying drawings wherein.

DESCRIPTION OF PREFERRED EMBODIMENTS

List of Symbols & Abbreviations

The following list of symbols and abbreviations is provided to assist in the explanation of example embodiments of the invention.

$T_g$ Guard interval duration in seconds
$T_u$ Useful symbol duration in seconds
$N_u$ Number of samples in useful part of symbol
μ Channel impulse response delay spread
CIR Channel impulse response
CP Continuous pilot
CTF Channel transfer function
DVB-T Digital video broadcasting—terrestrial transmission
FFT Fast Fourier Transform
IFFT Inverse FFT
MF Matched filter
OFDM Orthogonal frequency division multiplexing
QAM Quadrature amplitude modulation
SP Scattered pilot
TOA Time of arrival
TPS Transmission parameters signalling Embodiments of the present invention provide an improved technique for estimating the frequency response of a channel through which an Orthogonal Frequency Division (OFDM) signal has passed. As explained in the following paragraphs, the channel frequency response or channel transfer function (CTF) is estimated using pilot symbols which are transmitted with each OFDM symbol (see below and FIG. 1). A pilot assisted channel estimator interpolates samples of the CTF derived from the pilot signals. As will be explained interpolation may be performed in one or both of the time and the frequency dimensions. Embodiments of the present invention can provide an adaptation of the frequency dimension interpolation filter to improve the channel transfer function estimate, thereby improving the integrity of the data recovered from each OFDM symbol.

An example embodiment of the present invention will now be described with reference to detecting and recovering data from an OFDM symbol produced for example in accordance with Digital Video Broadcasting (DVB) standards including DVB-T and DVB-H. However, it will be appreciated that embodiments of the invention find application with other OFDM systems, such as, for example, the Japanese ISDB-T standard.

A COFDM symbol which is modulated in accordance with DVB standard is generated by modulating K narrow band carriers in parallel with the data to be communicated. As disclosed in the European telecommunications standards institute number EN300744 version 1.1.2 (1997-08) and entitled "Digital Video Broadcasting (DVB); Frame Structure Channel Coding And Modulation For Digital Terrestrial Television", the OFDM symbols are formed in the frequency domain and then converted to the time domain using an Inverse Fourier Transform. A diagram representing the time domain OFDM symbols is shown in FIG. 1.

Figure 1:
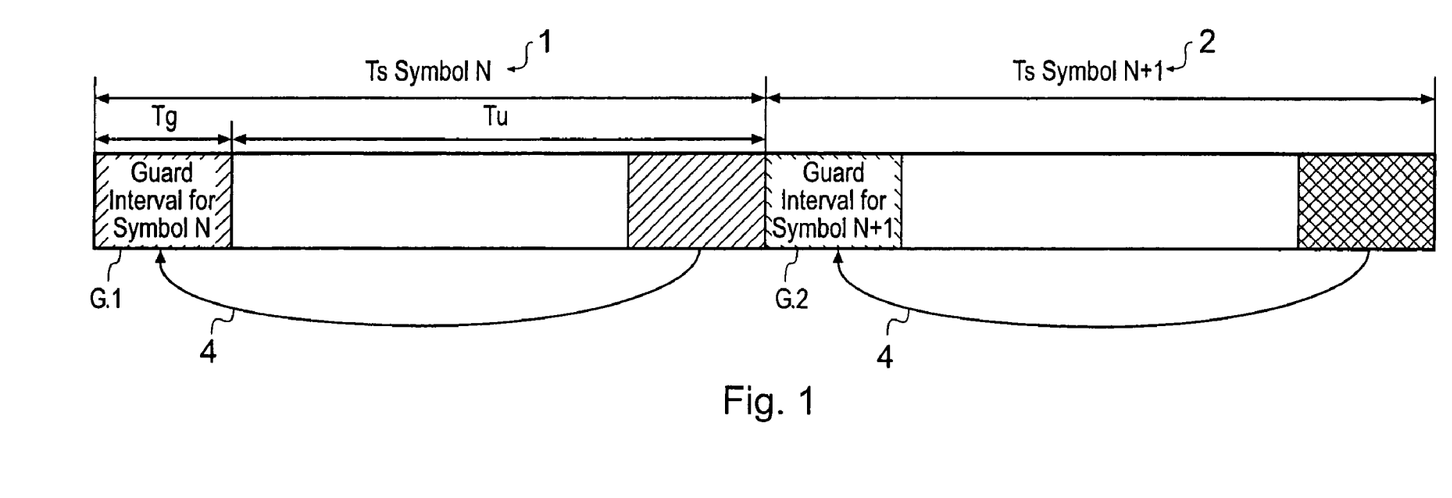
FIG. 1 is a schematic representation of two successive COFDM symbols.

In FIG. 1 two OFDM symbols represented as blocks 1, 2 are shown as they would be transmitted by a DVB transmitter with time progressing from left to right across the page. As shown in FIG. 1, each OFDM symbol 1, 2 has a useful part of the symbol during which the data is transmitted. This part of the symbol has duration of $T_u$ seconds and has $N_u$ samples. A guard interval G.1, G.2 of duration $T_g$ seconds separates the current symbol from the previous one. The guard interval has $N_g$ samples. For each symbol 1, 2 the guard interval G.1, G.2 therefore precedes the useful part of the symbol and is formed, as indicated by an arrow 4, by replicating the samples in the last $T_g$ seconds of the useful part of the symbol. Each OFDM symbol of $N_s$ samples therefore has duration $T_s = T_g + T_u$ seconds.

In order to recover the data within the OFDM symbols, the receiver must detect the data bearing signal samples from within the set of received signal samples corresponding to each OFDM symbol.

Receiver With Channel Estimator and Corrector

Figure 2:
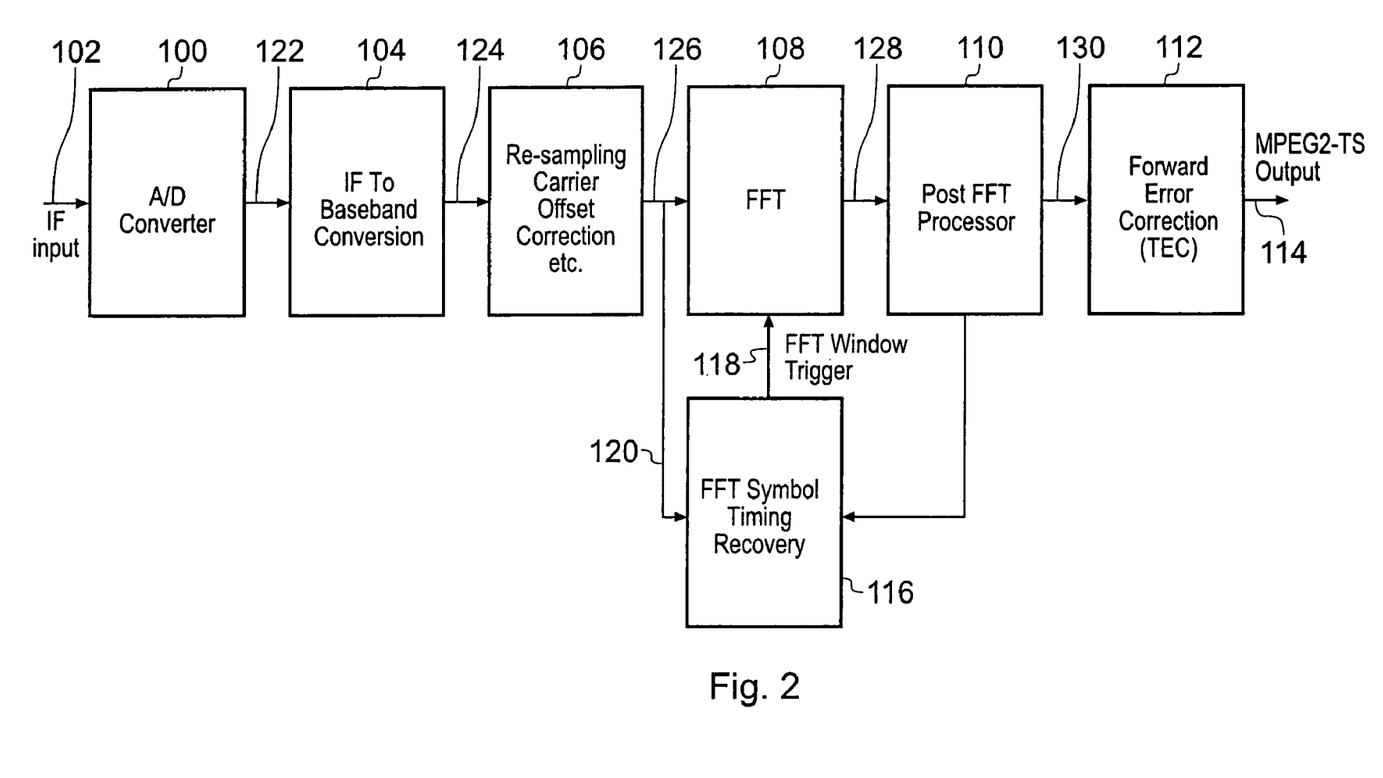
FIG. 2 is a schematic block diagram of a receiver according to an embodiment of the present invention.

A receiver for detecting and recovering data from a OFDM symbol, is shown in FIG. 2. In FIG. 2 an analogue to digital converter 100 is arranged to receive an intermediate frequency (IF) signal representing the detected radio signal on which the OFDM symbol has been modulated. The receiver also includes down conversion means and detection means in order to convert the radio frequency signal into an intermediate frequency signal, which is fed to the analogue to digital converter 100 via an input 102. Thus it will be appreciated that the receiver may also include radio frequency receiving and down converting means which are not shown in FIG. 2. After being analogue to digitally converted the received signal is processed by an intermediate frequency to base band conversion means 104 before being processed by a re-sampling and carrier offset correction processor 106. In some embodiments, the radio frequency signal may be directly converted to base-band. In this case, the intermediate frequency input to the analogue to digital converter 100 is zero Hertz and so there is no need for the intermediate frequency to base band conversion means 104. The re-sampling and carrier offset correction processor 106 is arranged to track in the frequency domain the K carriers of the OFDM modulation. The base band received signal samples are then fed to a Fast Fourier transform processor 108 which serves to convert the time domain received signal samples into the frequency domain. The data is then recovered from the frequency domain signal samples by a post FFT processor 110. The data is then fed to a forward error correction processor 112 which operates to decode the error correction encoded data to produce the recovered data at an output 114.

The receiver according to this example locates an FFT window time from which the data bearing signal samples are processed by the FFT processor 108. The FFT window position is adjusted in order that the window includes the maximum energy representative of the data bearing signal samples. To this end, an FFT symbol timing recovery processor 116 is arranged to generate a signal indicative of a symbol sync time which is fed to the FFT processor 108 via a connecting channel 118. The FFT symbol timing recovery processor 116 is arranged to detect the Symbol Sync Time (SST) from the received set of signal samples which represent each OFDM symbol. These are received from the re-sampling and carrier offset correction processor 106 via a connecting channel 120.

Figure 3:
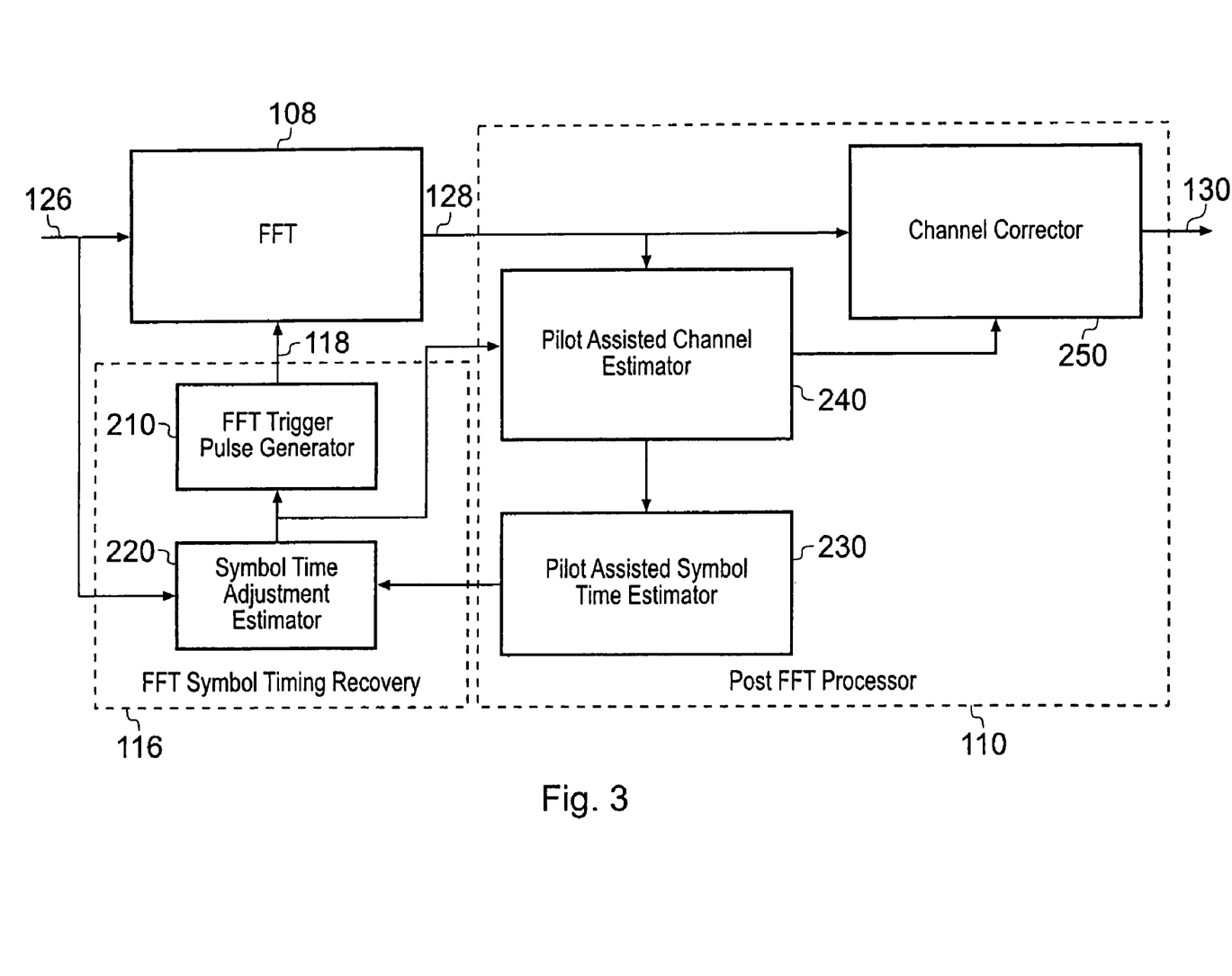
FIG. 3 is a schematic block diagram of an FFT block, FFT Symbol Timing Recovery block, and a Post FFT Processor block.

The FFT symbol-timing recovery processor 116 and the post-FFT processor 110 are shown in more detail in FIG. 3. The FFT symbol-timing recovery processor 116 and the post- FFT processor 110 operate to provide a symbol timing recovery process, which is described in [1].

In FIG. 3, the time domain samples representing the OFDM symbol are received by the FFT processor 108. The FFT processor 108 converts the time domain samples into the frequency domain. The frequency domain samples are then fed to the post-FFT processor 110. The time domain samples are also fed to a symbol timing recovery processor 116, and in particular to a symbol time adjustment estimator 220. As explained in [1], the symbol time adjustment estimator 220 includes a filter matched to the samples of the guard interval. The matched filter is excited by the OFDM symbol to produce an output signal from which the SST is calculated, assisted by a signal provided by the pilot assisted symbol time estimator 230. The output of the matched filter includes prominent pulses representing the discrete propagation paths existing on the channel. The SST is computed from the relative time of arrival of the earliest arriving prominent path. The difference between the relative times of arrival of the earliest and latest arriving paths is also calculated. This difference is an estimate of the channel response delay spread that is sent to the channel corrector 250 the operation of which is the main subject of this application.

More detail of the symbol synch time estimation and channel response delay spread will not be provided here since embodiments of the present invention concern the pilot assisted channel response estimation. However, more detail is provided in [1].

Channel Correction for OFDM

Figure 4:
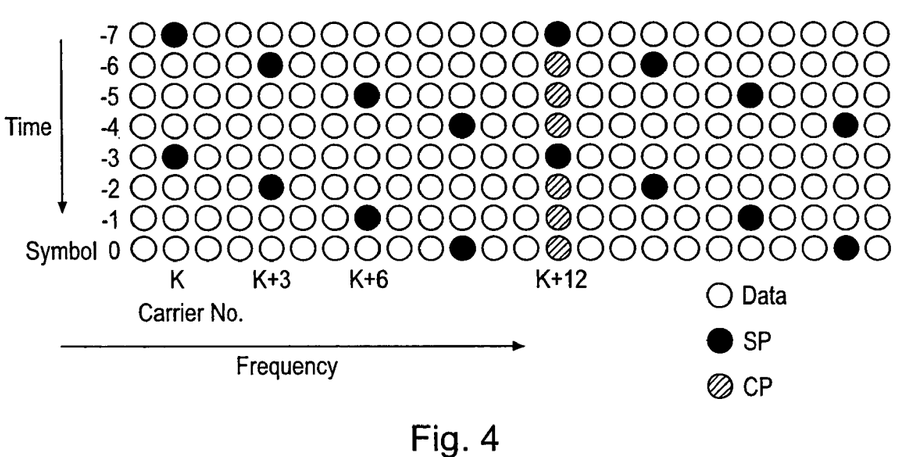
FIG. 4 is a schematic example time-frequency signal matrix for a DVB-T signal showing the distribution of pilot cells within the signal matrix.

Prior to transmission, each OFDM symbol or row of the matrix of FIG. 4 is converted into the time domain using an inverse Fourier transform. As each time domain symbol transits through the transmission channel, it undergoes many distortions. Such distortions may include:

Additive noise, with effect being to perturb the amplitudes and phases of each of the cells in the signal matrix.

Frequency selective fading resulting from multipath propagation, with effect being to selectively attenuate some sub-carriers whilst boosting others in each symbol (row of the matrix). Furthermore, this frequency selective fading may be time varying in the sense that the same sub-carriers do not suffer the same degree of attenuation from one symbol to the next.

Doppler shifts which cause the sub-carriers to smear into each other thereby loosing their othorgonality.

Other distorting effects that may arise from the receiver front end such as phase noise, carrier frequency offsets, impulsive interference and shifts in the FFT window position etc.

For a given cell in the signal matrix of FIG. 4, the effect of all these distortions can be modelled as a two-dimensional channel transfer function H(n,k) where n is the symbol (row) number and k is the sub-carrier (column) number. Given the complex value C(n,k) transmitted in a given cell, the complex value R(n,k) received in its place through such a channel is given by:

$$R(n,k)=C(n,k)H(n,k)$$

According to the present technique a pilot-assisted channel estimator 240 is arranged to use the combined known transmissions at the pilot cells to estimate and reduce the effects of H(n,k) within a given budget of time, complexity, power consumption and cost. The effects are estimated in both time and frequency dimension by interpolation of the samples of the CTF derived from the pilot cells. For example, distortion from frequency selective fading and noise can be estimated by calculations on the pilot cells of individual symbols along the frequency dimension. Distortions from Doppler shifts and time variation of the channel can be calculated across symbols along the time dimension. It is possible to combine both these calculations in a kind of two-dimensional channel estimation process but the computations required would be rather intensive [3]. Practical demodulators therefore carry out these calculations in sequence, often estimating the time dimension distortions first, followed by those in the frequency dimension.

In practical demodulators, ignoring the symbol number n for a given symbol, the channel is estimated by computing H(k) the channel transfer function (CTF) across all the sub-carriers in the given symbol. Then for the complex value R(k) received at each data sub-carrier position, we can estimate the transmitted complex symbol C(k) as:

$$C(k) = \frac{R(k)}{H(k)}$$

where k=0,1,2, . . . ,$N_u$–1 and $N_u$ is the number of sub-carriers in the OFDM system. Specifically, in the pilot-assisted channel estimator, the above equation is used at the pilot cells to estimate the sample of the CTF at the given cell.

Pilot Assisted Channel Estimation

The operation of the Pilot Assisted Channel Frequency Response Estimator 240 will now be described with reference to FIGS. 4 and 5. As shown in FIG. 4, the OFDM symbol includes a number of pilot cells, the positions, expected amplitudes and phases of which are known to the receiver. The post-FFT processor 110 is able to extract these received pilot cells from the frequency domain samples output from the FFT processor 108.

FIG. 4 schematically illustrates a multi-carrier signal matrix representing the transmission of data using OFDM. The matrix is composed of symbols of duration $T_u$ seconds each symbol having bandwidth of $N_u/T_u$ where $N_u$ is the number of OFDM sub-carriers or cells in the signal. In the DVB-T system for example $N_u$ is 1705 for the so-called 2K system, 3409 for a 4K system and 6817 for the 8K system. The values for $T_u$ are respectively 224 us, 448 us and 896 us. In the DVB-T signal matrix illustrated in FIG. 4 the rows of the matrix represent the individual symbols in time whilst the columns show the sub-carriers (in the frequency domain) of the given symbol.

Each cell in the signal matrix of FIG. 4 is sent as a QAM symbol with varying amplitudes and phases dependent on the data at the transmitter. The expected amplitudes and phases of the pilot symbol cells are known both to the transmitter and the receiver. There are both continuous and scattered pilots present in the signal matrix. For continuous pilots, the amplitude and phase of a sub-carrier at the position of the continuous pilot is known for all symbols. On the other hand, the position of the scattered pilots within each symbol vary in accordance with a predetermined pattern. There may be other sub-carriers such as those that convey the transmission parameters signalling (TPS) whose phases and amplitudes can be readily derived at the receiver. Finally, the other cells (excluding TPS sub-carriers) are modulated with QAM symbols that carry the actual payload of the transmission system in their phases and amplitudes. It is the extraction of this payload that is the job of the demodulator.

For each OFDM symbol, the pilot assisted channel estimator 240 operates on the frequency domain carriers from the FFT block 108. From amongst all the carriers, the pilot carriers are identified and extracted. There are only a limited number of pilot carriers per OFDM symbol, which in the example of DVB-T are spaced nominally every twelve carriers. The channel estimator computes the value of the CTF at each pilot cell by dividing the complex value of each received pilot by its known or expected complex value. The result of this for a given OFDM symbol is in effect a twelve-fold decimated version of the CTF designated as $H_{12}(k)$. In the example of DVB-T, the pilot cells are distributed between successive OFDM symbols in a manner that allows further reduction of this sample spacing by use of time dimension processing such as described in [2]. This additional time-dimension processing has the effect of interpolating the CTF estimates over a number of successive OFDM symbols in the time dimension. Such time dimension processing is not the subject of the current application but in the example of DVB-T such techniques can be applied to successive estimates of $H_{12}(k)$ to produce a 3-fold decimation of the CTF estimate $H_3(k)$.

The channel estimator then interpolates the CTF in the frequency dimension by a factor of three so that a CTF estimate is provided for every carrier including the data-bearing carriers. The sequences $H_{12}(k)$ and $H_3(k)$ can be described in equation form as:

$$H_{12}(k) = \begin{cases} \frac{R(k)}{P_C(k)} & k \bmod 12 = 0 \\ 0 & \text{otherwise} \end{cases}$$

$$H_3(k) = \begin{cases} H_{12}(k) & k \bmod 12 = 0 \\ H_I(k) & k \bmod 3 = 0 \\ U & \text{otherwise} \end{cases}$$

where $R(k)$ is the complex value received for the k-th sub-carrier, $P_C(k)$ is the known or expected complex value of the transmitted pilot at matrix column k and $H_I(k)$ results from time dimension processing of the $H_{12}$ along column (sub-carrier) k across neighbouring symbols [4]. This equation assumes a symbol for which the first sub-carrier for which k=0 is a pilot. Otherwise k=0 at the first pilot sub-carrier.

Figure 5:
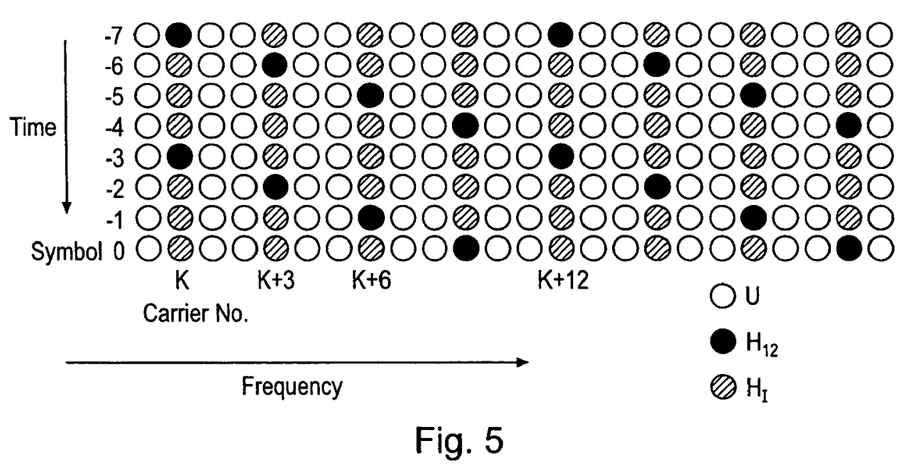
FIG. 5 is a schematic example time-frequency signal matrix showing matrix cells for which the channel frequency response estimation is derived via time axis processing.

FIG. 5 schematically illustrates the matrix after time dimension processing to obtain $H_3(k)$. At the cells marked as U, the CTF is not known yet and so is set to zero. The CTF samples at these cells will be calculated subsequently by the frequency dimension processing.

The frequency dimension processing to compute the full CTF H(k) is a filtering operation to complete the 3-fold interpolation along the frequency dimension of $H_3(k)$. This filtering of $H_3(k)$ can be expressed as:

$$H(k) = \sum_{i=-M}^{M} H_3(k+i)g(M+i) \Leftrightarrow F\{h(k)G(k)\}$$

where $F\{.\}$ represents the Fourier transform, $h(k)=F^{-1}\{H_3\}$ (inverse transform of $H_3(k)$) is the time domain impulse response of the channel whilst $G(k)=F\{g\}$ (the Fourier transform of the filter impulse response $g(i)$) is the transfer function of the frequency interpolation filter. The right-most part of this equation provides another way of interpreting the frequency interpolation filtering of $H_3(k)$ namely, frequency interpolation filtering of $H_3(k)$ can also be viewed as a windowing of the channel impulse response. Here, G(k) (transfer function of interpolation filter) is the window whilst h(k) (impulse response of the channel) is the signal to which the window is applied. This interpretation will be used henceforth to describe the invention.

Within the Post FFT processor, these CTF estimates are sent to the Channel Corrector block 250 where they are used to equalise the effect of the channel on the data.

Sources of Noise in Frequency Dimension Channel Estimation

Figure 6:
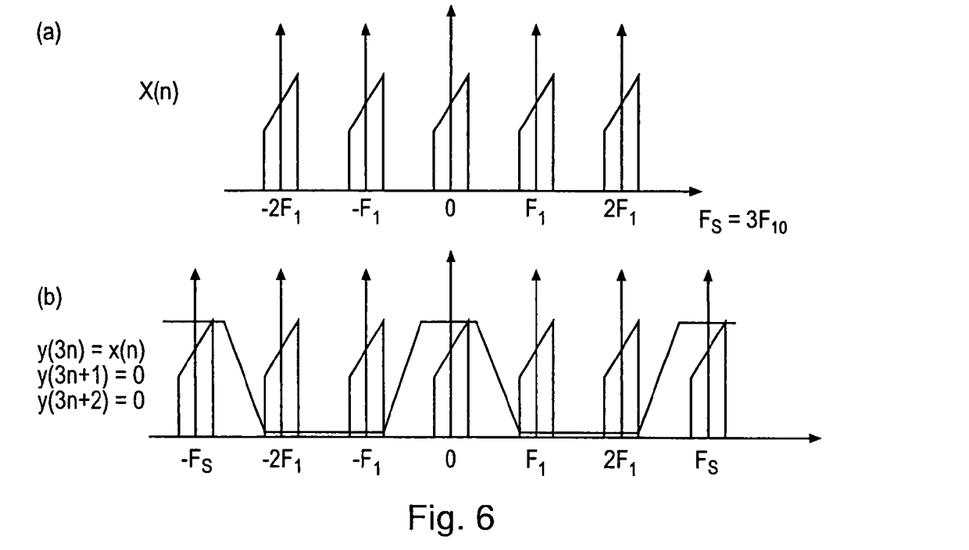
FIG. 6A is a schematic illustration of the spectrum of a conceptual digital signal with sampling rate of $F_1$ samples per second.
FIG. 6B is a schematic illustration of a conceptual three-fold up-sampled version of the input signal of FIG. 6A with a sampling rate of $3F_1$ samples per second.

The three fold up sampling of $H_3(k)$ results in spectral folds that should be eliminated by filtering in order to avoid aliasing. This can be seen by comparing FIGS. 6(a) and 6(b). FIG. 6(a) shows the spectrum of an input signal x(n) with a sampling frequency $F_1$. Here the spectrum of the signal is replicated at all multiples of the sampling frequency $F_1$. FIG. 6(b) shows the spectrum of y(n), which is a 3-fold up-sampled version of x(n) having a sampling frequency, $F_S=3F_1$. Superposed on this spectrum is also the frequency response of a typical filter that could be used to discard the unwanted aliases of the input signal as part of the interpolation filtering process.

A typical specification for the interpolation filter having the characteristics shown in FIG. 6(b) is as follows:

Low pass filter with a low pass-band ripple and linear phase.

Cut-off frequency, $F_C$: $\frac{1}{2}B < F_C \leq F_1 - \frac{1}{2}B$, where B is the signal bandwidth.

Stop-band attenuation should be as low as possible to minimise noise from the replicas of the input signal spectrum centred at $\pm F_1$.

Noise can be introduced into the interpolated signal not only by the choice of $F_C$ relative to B and $F_1$ but also inadequate stop-band attenuation. As stop-band attenuation is largely a function of filter order, adequate attenuation can be assured by choice of appropriate order for the interpolation filter.

Noise from Frequency Interpolation

As described above, the signal to be filtered by the interpolation filter is composed of frequency domain samples. Accordingly, the signal to be windowed by the interpolation filter's transfer function is a time domain signal—the channel impulse response. The bandwidth of the filter can therefore be expressed as the duration of the window formed from the frequency response of the filter. As the sampling rate $F_1$ of $H_3(k)$ is a third of the ultimate sampling rate of the full CTF H(k), this means that the estimated H(k) is only resolvable to one third of the output sampling rate of $3F_1$. Accordingly if the channel impulse response (CIR) delay spread exceeds $T_u/3$ seconds which is equivalent to the maximum length of the frequency interpolation filter transfer function window, some CIR energy will not fall under the window thereby introducing noise in the frequency interpolation. Another interpretation of this is that if the coherence bandwidth of the channel is narrower than $3/T_u$Hz, then the 3-fold decimated $H_3(k)$ would be corrupted by spectral folding thereby introducing noise in the frequency interpolation [4]. Considering the duality of time and frequency, this folding means that the long CIR would overlap with adjacent replicas after $\pm T_u/6$ seconds.

Figure 7A:
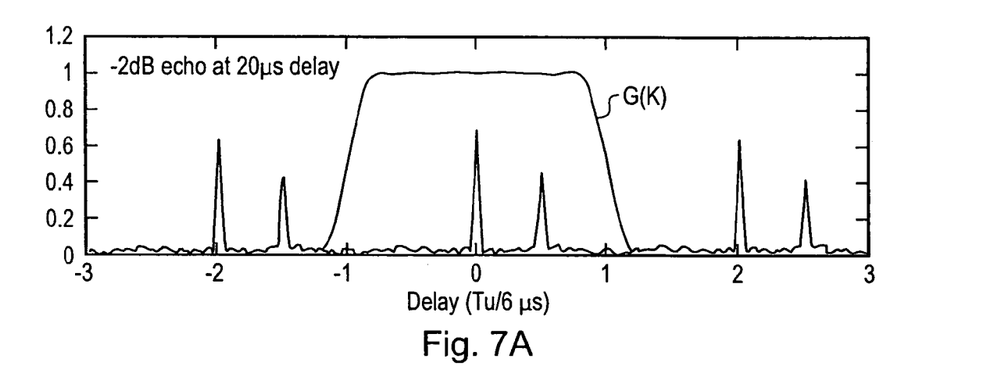
FIG. 7A schematically illustrates the frequency response window of the frequency interpolation filter applied to a first example short Channel Impulse Response.
Figure 7B:
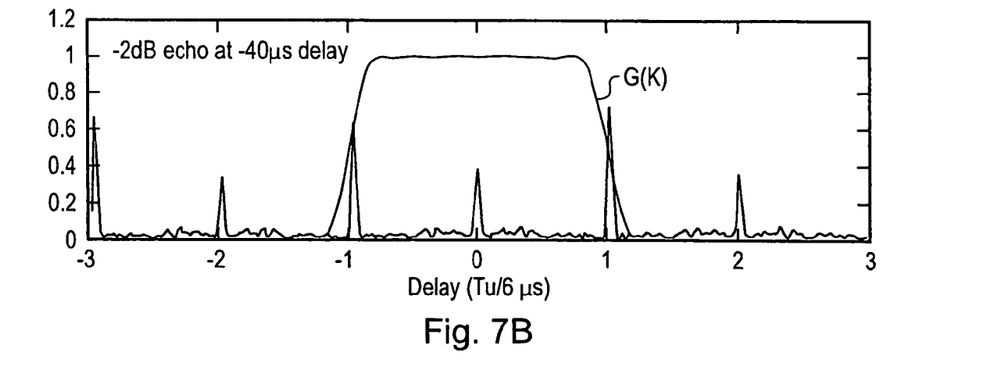
FIG. 7B schematically illustrates the frequency response window of the frequency interpolation filter applied to a second example long Channel Impulse Response.

FIGS. 7A and 7B schematically illustrate the frequency interpolation filter's transfer function G(k) as a window over the channel impulse response (CIR) as explained above. The horizontal axes in FIGS. 7A and 7B are therefore in units of $T_u/6$ seconds. As this example is based on a 2K DVB-T system, the symbol duration $T_u$=224 us so $T_u/6$=37.3 us. In both FIGS. 7A and 7B the CIR is composed of two paths. In FIG. 7A the main path at zero delay is followed by a −2 dB echo $T_u/11$ seconds later whilst in FIG. 7B there is a −2 dB path at zero relative delay followed by the main path $2T_u/11$ seconds later. It is to be noted in both FIGS. 7A and 7B that with a spectral folding frequency at $\pm T_u/6$ seconds, the 3-fold up-sampling of $H_3(k)$ replicates the CIR at multiples of $T_u/3$ seconds. As is shown in FIG. 7A, the interpolation filter frequency response window is intended to pick out the replica that starts at time zero whilst rejecting all the others otherwise they would fall under the window and so introduce folding or overlap noise into the frequency dimension channel estimation.

To match the minimum coherence bandwidth of $3/T_u$Hz the filter frequency response window also has a maximum duration (bandwidth) of $T_u/3$ seconds implying a maximum cut-off frequency of $\pm T_u/6$ seconds for the filter. In FIG. 7B however, the CIR has a delay spread of $2T_u/11$ seconds that is larger than $T_u/6$ seconds. This results in the main path of the target CIR replica lying just beyond the −3 dB point ($T_u/6$ seconds) of the frequency response window whilst also pulling in the main path component of the CIR replica that starts at $-2T_u/6$ seconds. Thus for CIR delay spreads longer than $T_u/6$ seconds, these effects will introduce noise in the frequency interpolation process of the channel estimator if left unchecked.

Frequency Domain Channel Estimation

As the noise degradation in frequency interpolation depends on the CIR delay spread, we need to know the CIR delay spread in order to reduce this degradation. As mentioned above a symbol time acquisition and tracker based on an adaptive matched filter whose taps are updated every symbol from the samples in the guard interval has previously been presented in [5] and [6]. The tracker includes a time domain based mode which uses a guard interval adapted matched filter (MF) to estimate and then track the CIR by finding the TOA of all paths that lie within $T_g$ seconds of the main path where $T_g$ is the duration of the guard interval in use. In our co-pending patent application [7], this range was extended to cover all propagation paths that lie within $\pm 7T_u/24$ seconds of the main path. When this tracker is used the CIR delay spread can be calculated from the TOA of the first and last significant propagation paths in the CIR. This CIR delay spread can thus be used to reduce the frequency interpolation noise in the channel estimator.

Reducing Interpolation Noise for Long Delay Spreads

As described above, FIG. 7B illustrates the problem of noise arising from frequency interpolation of $H_3(k)$ when the CIR delay spread is longer than $T_u/6$ seconds. On the one hand, the last impulse in the CIR would lie just beyond the −3 dB point of the filter frequency response window whilst on the other hand, the last path of the CIR replica starting at $-2T_u/6$ seconds will fall under the window contributing noise. With knowledge of the CIR delay spread, it is possible according to the present technique to shift the required CIR replica in a manner as to centre it underneath the window thereby avoiding both degradations. Centring is done by applying a phase spin of $\mu/2$ (where $\mu$ in samples is the CIR delay spread) to the decimated CTF $H_3(k)$ before performing frequency interpolation filtering. With a given spin of $\mu/2$ samples, then the filtering equation considering the time-frequency duality criterion above becomes:

$$R(k) = \sum_{i=-M}^{M} H_3(k+i)e^{j\pi\mu/N_u}g(M+i) \equiv F\left\{h\left(k+\frac{\mu}{2}\right)G(k)\right\}$$

Figure 8A:
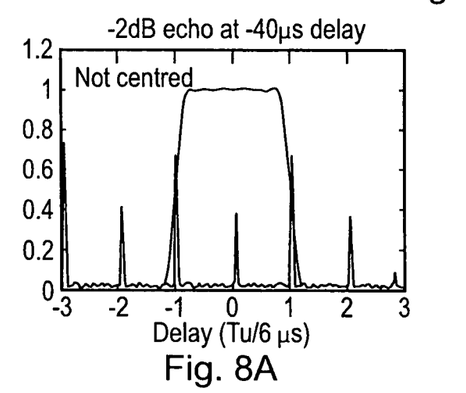
FIG. 8A to 8D schematically illustrate the effect of centring the Channel Impulse Response under the frequency response window of the frequency interpolation filter.
Figure 8B:
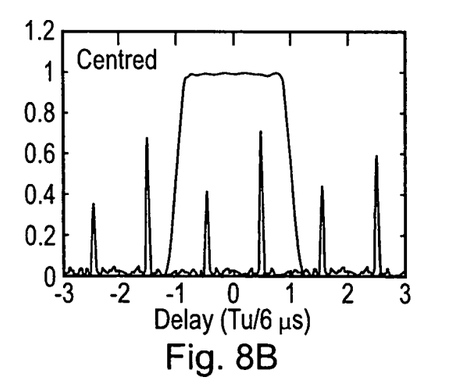
Figure 8C:
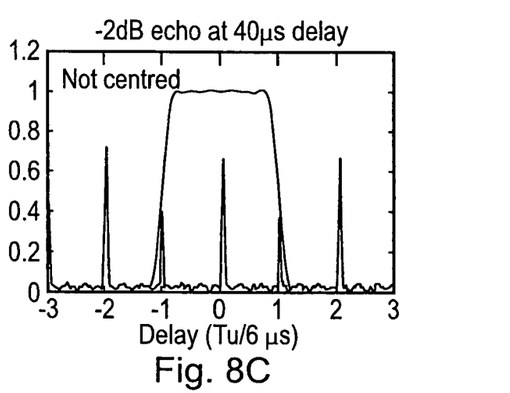
Figure 8D:
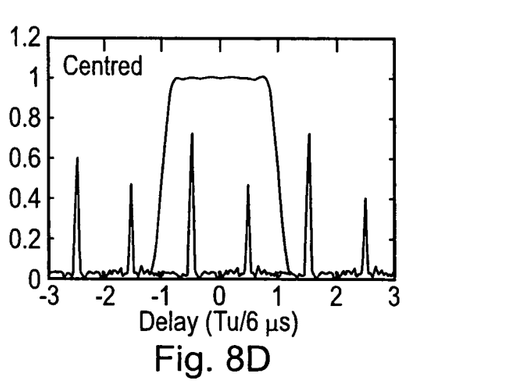

FIGS. 8A to 8D schematically illustrate the frequency interpolation filter's transfer function $G(k)$ as a window over the channel impulse response (CIR) as explained above. FIGS. 8A and 8B illustrate a so-called "pre-echo" CIR in which the main path follows a −2 dB path that arrived $2T_u/11$ seconds previously. FIGS. 8C and 8D illustrate a so-called "post-echo" CIR in which the main path is followed $2T_u/11$ seconds later by a −2 dB echo. FIGS. 8A and 8C illustrate the windowing of the CIR if it were un-centred whilst FIGS. 8B and 8D illustrate the centred CIR windowing for each CIR, respectively.

Reducing Interpolation Noise for Short Delay Spreads

All the sketches in FIGS. 7 and 8 indicate another source of noise for the frequency interpolation, the effect of which can be minimised especially for shorter CIR delay spreads. As outlined above, the frequency dimension channel estimation follows the time dimension channel estimation. The time dimension processing itself introduces some noise in the channel estimation. This noise adds to the usual random noise that afflicts the pilots but cannot generally be estimated through interpolation as such noise is not correlated across sub-carriers of a given symbol. This noise is shown in the sketches of FIGS. 7 and 8 as the additive noise of the noise floor. This kind of noise is sometimes called backstop noise as it is independent of the signal level. In general, the wider the duration (bandwidth) of the interpolation filter frequency response window, the more of this noise is incorporated into the frequency interpolation. Therefore, reducing the window duration (interpolation filter bandwidth) from its maximum $T_u/3$ seconds, would also reduce the amount of backstop noise in the interpolation.

When seen as a window over the CIR, the interpolation filter's frequency response only has to be as wide as the CIR delay spread of the channel. With the delay spread provided by the symbol tracker summarised above, it is thus possible to dimension the bandwidth of the frequency interpolation filter accordingly. It is possible to re-compute the coefficients of such a filter every time the CIR delay spread changes by changing for example a Kaiser factor in the window design method for FIR filters [9]. Another way of adapting the frequency interpolation filter's cut-off frequency to the CIR delay spread is to switch-in different pre-designed filters of varying cut-off frequencies dependent on the current value of the CIR delay spread.

Pilot Assisted Channel Estimator

Figure 9:
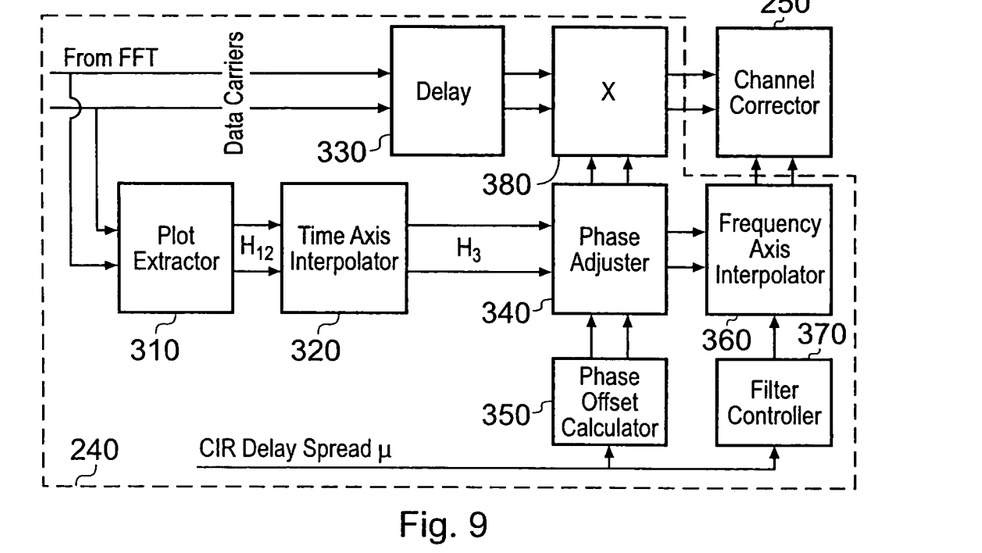
FIG. 9 schematically illustrates a Pilot Assisted Channel Estimation and Correction circuit in accordance with an embodiment of the invention.

FIG. 9 schematically illustrates an example of a pilot assisted channel estimator 240 according to the present technique. As shown in FIG. 9 the pilot assisted channel estimator 240 receives the frequency domain symbol samples from the FFT. The pilot carriers are extracted from the received symbol by a Pilot Extractor 310 and used to form an estimate of the channel. In DVB-T for example, since the carriers are distributed in a ratio of one pilot carrier for every twelve data bearing carriers, the estimate of the channel transfer function $H_{12}(k)$ provides a discretely sub-sampled Channel Transfer Function (CTF) in accordance with a sampling rate of one twelfth that of the symbol samples from the FFT. Interpolation of the CTF in the time dimension is then performed by a time axis interpolator 320, by utilising CTF estimates from successive symbols. The time axis interpolation provides a facility of increasing the sampling rate of the CTF to one in three. Accordingly, the time axis interpolator 320 forms CTF samples $H_3(k)$, which are received by a phase adjuster 340.

The phase adjuster 340 spins $H_3(k)$ to center the CIR under the frequency interpolator filter window prior to frequency interpolation filtering by the frequency axis interpolator 360. This spinning is achieved by using the CIR delay spread μ for the current channel conditions provided by the symbol time adjustment estimator 220 to generate a phase spin μ/2 provided by the phase offset calculator 350. The phase offset calculator 350 includes a look up table providing sine and cosine coefficients that represent the required phase spin μ/2 according to Euler's equation. The frequency axis interpolator 360 then forms a centered interpolated full-band version of the CTF by interpolating in the frequency dimension the phase adjusted sub-sampled version of the channel transfer function.

Additionally, the Channel Estimator is provided with a filter selector 370 which receives the CIR delay spread μ from the symbol time adjustment estimator and which selects a predetermined interpolation filter of an appropriate bandwidth for use by the Frequency Axis Interpolator 360. The noise degradations identified above are thus inhibited by centering the CIR and using a frequency interpolation filter appropriate to the delay spread of the channel. The channel corrector 250 then applies the CTF estimate to correct for the effects of the channel impulse response on the received symbol.

The Delay block 330 is used to store the data carriers whilst channel estimation takes place. The phase adjuster 380 applies the same phase spin to the data-bearing carriers as is applied to $H_3(k)$.

Figure 10:
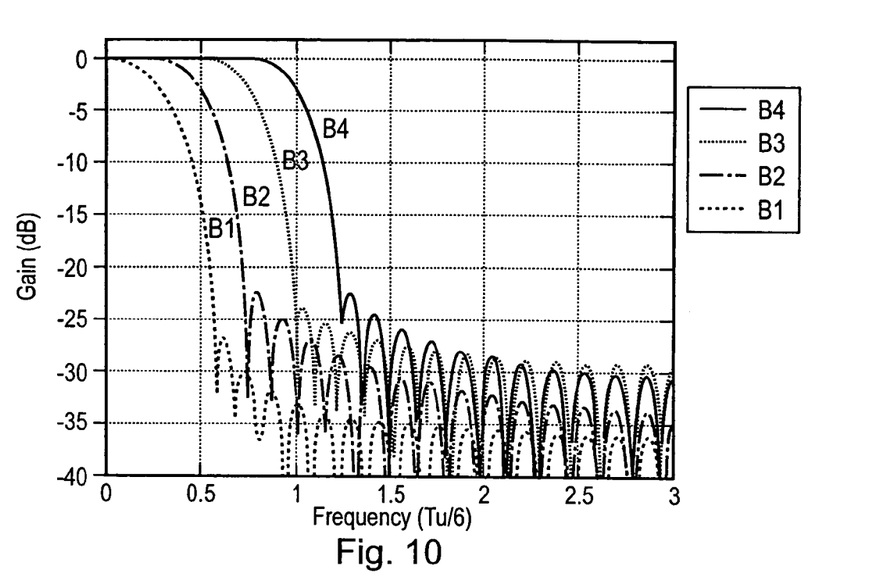
FIG. 10 schematically illustrates the gain/frequency characteristics of a number of frequency interpolation filters having various cut-off frequencies.

FIG. 10 shows the frequency characteristics of four example interpolation filters, having varying cut-off frequencies, that can be selected by a filter controller 370 for use by the Frequency Axis Interpolator 360.

Figure 11A:
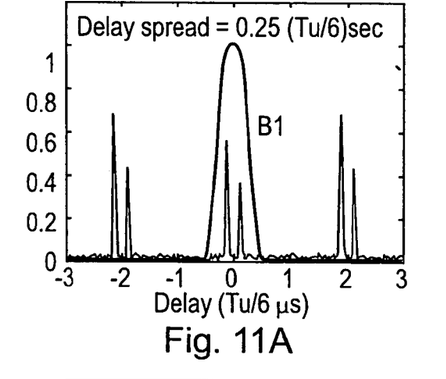
FIGS. 11A to 11D schematically illustrate the selection of frequency interpolation filter according to a Channel Impulse Response delay spread.
Figure 11B:
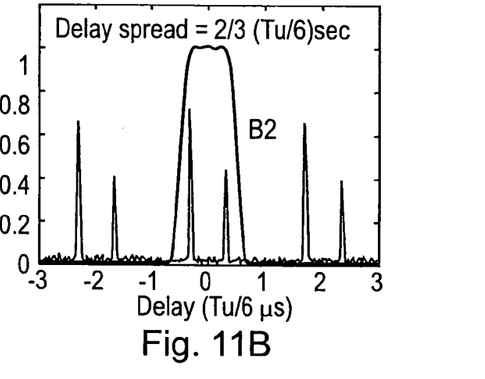
Figure 11C:
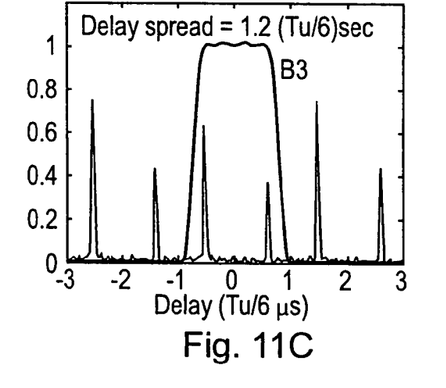
Figure 11D:
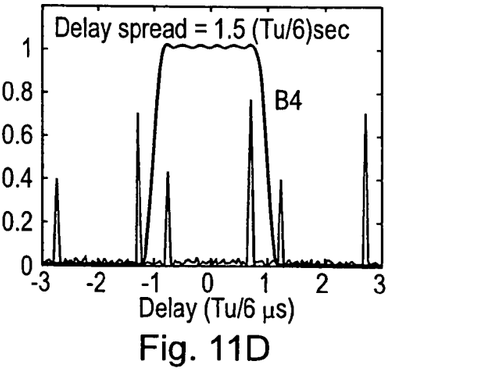

FIGS. 11A to 11D illustrates the window function of the four filters illustrated in FIG. 10, each filter being selected according to the CIR delay spread. Each CIR has undergone the appropriate phase spin whose result is to centre the CIR under its particular interpolation filter window. Notice the reduced level of backstop noise falling under the filter of narrowest bandwidth (FIG. 11A) as compared with filters of greater bandwidth (FIGS. 11B to 11D).

Summary of Operation

Figure 12:
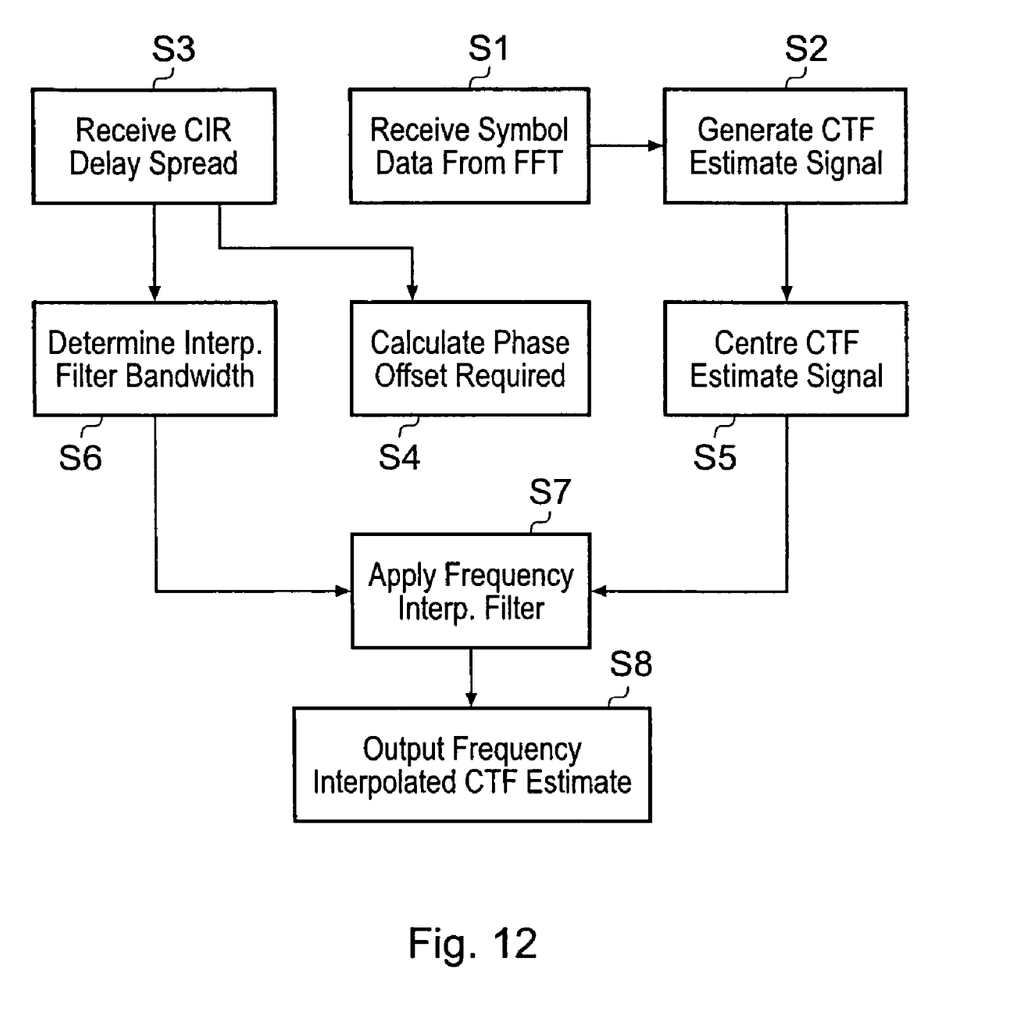
FIG. 12 provides a schematic flow diagram illustrating the operation of a frequency interpolation filter.

FIG. 12 schematically illustrates a method of performing frequency interpolation of a channel impulse response (CIR) estimate signal including pilots signals. Referring to FIG. 12, at a step S1, symbol data including pilot signals is received from an FFT processor. At a step S2, pilot signals are extracted from the symbol data and used to generate a CTF estimate signal. At a step S3, an indication of the channel impulse response (CIR) delay spread is received at the frequency interpolation apparatus. At a step S4, the received CIR delay spread is used to calculate a phase offset required to reduce energy from aliases which may be present in the CTF estimate signal while retaining desired signal components within a pass band window of a frequency interpolation filter. At a step S5, the CTF estimate signal is shifted in accordance with the phase offset calculated in the step S4. At a step S6, the CIR delay spread received in step S3 is used to determine a suitable bandwidth for the frequency interpolation filter. At a step S7, a frequency interpolation filter having a bandwidth as determined in step S6 is applied to the shifted CTF estimate signal generated in step S5. This results in a frequency interpolated CTF estimate signal, which is output at a step S8.

Various modifications may be made to the example embodiments herein before described without departing from the scope of the present invention. For instance, it will be appreciated that the term pilot should be interpreted broadly as meaning any signal or data symbols, which are transmitted with the data to be communicated, and which are known to the receiver. Furthermore, it will be understood that embodiments of the present invention may use either frequency interpolation or time interpolation or both, one of the time or frequency dimension channel response interpolation techniques being used without the other. For example, if an OFDM signal includes only continuous pilots then time dimension interpolation may not be required.

REFERENCES

[1] Co-pending UK patent application serial number 0115061.4.

[2] M. Alard, R. Lassalle, "Principles of modulation and channel coding for digital broadcasting for mobile receivers", EBU Review, No. 224, August 1987.

[3] M. Speth, S. Fechtel, et al, "Optimum receiver design for OFDM-based broadband transmission—Part II: A case study", IEEE trans. On Communications, pg 571 to 578, vol. 49, No. 4, April 2001.

[4] Erik Stare, "Mobile reception of 2K and 8K DVB-T Signals," Proceedings of IBC '98 pp 473-478.

[5] S. Atungsiri, J. Wilson, "Maximum-Likelihood symbol acquisition for DVB-T receivers", Great Britain Patent Application No. 0027424.1, 9 Nov. 2000.

[6] S. Atungsiri, J. Wilson, "Closed-loop pilot assisted symbol tracker for DVB-T receivers", European Patent Application No. 02254020.7, 10 Jun. 2002.

[7] S. Atungsiri, "OFDM demodulation for channels with long delay spreads", United Kingdom Patent Application No. 0225039.7, 28 Oct. 2002.

[8] EN 300 744 Digital Video Broadcasting (DVB) Framing structure, channel coding and modulation for digital terrestrial television.

[9] Richard Lyons, "Understanding digital signal processing", Addison-Wesley, 1996

The invention claimed is:

1. A receiver for recovering data from a received symbol of signal samples generated in accordance with Orthogonal Frequency Division Multiplexing (OFDM), the OFDM symbol including pilot carrier signals, said receiver including a pilot assisted channel estimator comprising:

a pilot extractor configured to extract the pilot carrier signals from the signal samples, and to generate an estimate of a sample of a channel frequency response for each of the pilot carrier signals in the received OFDM symbol, by comparing the extracted pilot carrier signals with predetermined versions of the pilot carrier signals;

a frequency interpolation filter configured to interpolate the samples of the channel frequency response estimate, and a filter controller, the frequency response of the frequency interpolation filter having a pass bandwidth which is adjustable, and the filter controller configured to adjust the bandwidth of the frequency interpolation filter to reduce noise in the estimate of channel frequency response;

a phase offset calculator configured to calculate a phase adjustment to the samples of the channel frequency response estimate; and a phase adjuster configured to apply the phase adjustment to the channel frequency response estimate, wherein the phase adjustment when applied has an effect of reducing energy from aliases of the channel frequency response estimate within a pass band window of the frequency interpolation filter.

2. A receiver as claimed in claim 1, wherein the filter controller is configured to adapt the bandwidth of the frequency interpolation filter in accordance with a delay spread of a channel impulse response, the bandwidth being adjusted in proportion to a length of a delay spread of a channel impulse response estimate.

3. A receiver as claimed in claim 1, wherein the frequency interpolation filter comprises a plurality of interpolation filters each having a predetermined bandwidth, the filter controller being configured to select one of the plurality of interpolation filters to adjust the bandwidth of the frequency interpolation filter.

4. A receiver according to claim 1, comprising:
a symbol time adjustment estimator configured to estimate a timing adjustment for detecting the OFDM symbol in accordance with a delay spread of a channel impulse response,
wherein the phase offset calculator is configured to calculate the phase adjustment from the timing adjustment.

5. A receiver according to claim 1, comprising:
a channel correction processor configured to reduce the effects of a channel impulse response in the received OFDM symbol by substantially canceling a channel impulse response estimate from the received OFDM symbol.

6. A receiver according to claim 1, wherein the OFDM symbol includes pilot carrier signals provided at different sub-carrier locations for each of a set of OFDM symbols, the sub-carrier locations of the pilot carrier signals being repeated for subsequent sets of OFDM symbols, said pilot assisted channel estimator including
a time interpolation filter configured to interpolate the samples of the channel frequency response estimate derived from the pilot carrier signals at corresponding sub-carrier locations within temporally separated OFDM symbols to generate an interpolated version of the channel frequency response estimate, the interpolated version being interpolated by the frequency interpolation filter to provide the channel frequency response estimate for canceling from the OFDM symbol.

7. A method of recovering data from a received symbol of signal samples generated in accordance with Orthogonal Frequency Division Multiplexing (OFDM), the OFDM symbol including pilot carrier signals, said method comprising:
extracting the pilot carrier signals from the signal samples;
generating an estimate of a sample of a channel frequency response for each of the pilot carrier signals in the received OFDM symbol, by comparing the extracted pilot carrier signals with predetermined versions of the pilot carrier signals;
interpolating the samples of the channel frequency response estimate using a frequency interpolation filter, the frequency interpolation filter having a pass bandwidth which is adjustable, and the interpolating the samples of the channel frequency response estimate including adjusting the bandwidth of the frequency interpolation filter to reduce noise in the estimate of channel frequency response;
calculating a phase adjustment to the samples of the channel frequency response estimate; and applying the phase adjustment to the channel frequency response estimate, wherein the phase adjustment when applied has an effect of reducing energy from aliases of the channel frequency response estimate within a pass band window of the frequency interpolation filter.

8. A method as claimed in claim 7, wherein the bandwidth of the frequency interpolation filter is adjusted in proportion to a length of a delay spread of a channel impulse response estimate.

9. A method as claimed in claim 7, wherein the frequency interpolation filter comprises a plurality of interpolation filters each having a predetermined bandwidth, the method comprising the step of selecting one of the plurality of interpolation filters to adjust the bandwidth of the frequency interpolation filter.

10. A method according to claim 7, comprising:
estimating a timing adjustment for detecting the OFDM symbol in accordance with a delay spread of a channel impulse response, the phase adjustment being calculated from the timing adjustment.

11. A method according to claim 7, comprising:
substantially canceling a channel impulse response estimate from the received OFDM symbol to reduce the effects of the channel impulse response in the received OFDM symbol.

12. A method according to claim 7, wherein the OFDM symbol includes pilot carrier signals provided at different sub-carrier locations for each of a set of OFDM symbols, the sub-carrier locations of the pilot carrier signals being repeated for subsequent sets of symbols, the method including
interpolating the samples of the channel frequency response estimate derived from the pilot carrier signals at corresponding sub-carrier locations within temporally separated OFDM symbols to generate an interpolated version of the channel frequency response estimate, the interpolated version being interpolated by the frequency interpolation filter to provide the channel frequency response estimate for canceling from the OFDM symbol.

13. A pilot assisted channel estimator for estimating a channel frequency response from pilot carrier signals included within a received Orthogonal Frequency Division Multiplexed (OFDM) symbol, the pilot assisted channel estimator comprising:
a pilot extractor configured to extract the pilot carrier signals from signal samples, and to generate an estimate of a sample of the channel frequency response for each of the pilot carrier signals in the received OFDM symbol, by comparing the extracted pilot carrier signals with predetermined versions of the pilot carrier signals;
a frequency interpolation filter configured to interpolate the samples of the channel frequency response estimate, and a filter controller, the frequency response of the frequency interpolation filter having a pass bandwidth which is adjustable, and the filter controller configured to adjust the bandwidth of the frequency interpolation filter to reduce noise in the estimate of channel frequency response;
a phase offset calculator configured to calculate a phase adjustment to the samples of the channel frequency response estimate; and
a phase adjuster configured to apply the phase adjustment to the channel frequency response estimate, wherein the phase adjustment when applied has an effect of reducing energy from aliases of the channel frequency response estimate within a pass band window of the frequency interpolation filter.

14. A pilot assisted channel estimator as claimed in claim 13, wherein the filter controller is configured to adapt the bandwidth of the interpolation filter in accordance with a delay spread of a channel impulse response, the bandwidth being adjusted in proportion to a length of a delay spread of a channel impulse response estimate.

15. An apparatus for recovering data from a received symbol of signal samples generated in accordance with Orthogonal Frequency Division Multiplexing (OFDM), the OFDM symbol including pilot carrier signals, said apparatus comprising:

means for extracting the pilot carrier signals from the signal samples;

means for generating an estimate of a sample of a channel frequency response for each of the pilot carrier signals in the received OFDM symbol, by comparing the extracted pilot carrier signals with predetermined versions of the pilot carrier signals;

means for interpolating the samples of the channel frequency response estimate using a frequency interpolation filter, the frequency interpolation filter having a pass bandwidth which is adjustable, and the means for interpolating the samples of the channel frequency response estimate includes means for adjusting the bandwidth of the frequency interpolation filter to reduce noise in the estimate of channel frequency response;

means for calculating a phase adjustment to the samples of the channel frequency response estimate; and means for applying the phase adjustment to the channel frequency response estimate, wherein the phase adjustment when applied has an effect of reducing energy from aliases of the channel frequency response estimate within a pass band window of the frequency interpolation filter.

* * * * *